United States Patent [19]
Slocum et al.

[11] Patent Number: 5,888,614
[45] Date of Patent: Mar. 30, 1999

[54] MICROPERFORATED STRENGTH FILM FOR USE AS AN ANTI-INFILTRATION BARRIER

[75] Inventors: Donald H. Slocum, 61 Chimney Ridge, Morristown, N.J. 07960; Daniel P. Healey, Brielle, N.J.

[73] Assignee: Donald H. Slocum, Morristown, N.J.

[21] Appl. No.: 801,205

[22] Filed: Feb. 18, 1997

Related U.S. Application Data

[63] Continuation-in-part of Ser. No. 470,071, Jun. 6, 1995, abandoned.

[51] Int. Cl.$^6$ ................................ E04B 2/72; B32B 3/24
[52] U.S. Cl. ................... 428/132; 428/137; 428/131; 428/105; 428/182; 428/220; 428/913; 428/338; 52/408; 52/746.1; 83/30; 83/347; 156/250; 156/209; 156/252; 156/253; 156/164; 156/244.18; 156/244.19
[58] Field of Search ..................... 428/137, 131, 428/105, 182, 220, 132, 338, 913; 52/408, 746.1; 156/250, 209, 252, 253, 164, 244.18, 244.19; 83/30, 347

[56] References Cited

U.S. PATENT DOCUMENTS

| | | |
|---|---|---|
| 3,604,302 | 9/1971 | Smythe ........................... 83/659 |
| 3,682,028 | 8/1972 | Clayton et al. ..................... 83/30 |
| 3,779,285 | 12/1973 | Sinibaldo ........................ 138/118.1 |
| 4,039,364 | 8/1977 | Rasmussen ....................... 156/164 |
| 4,653,363 | 3/1987 | Lang ................................. 83/30 |
| 4,898,761 | 2/1990 | Dunaway et al. .................. 428/137 |
| 5,554,246 | 9/1996 | Anwyll, Jr. ........................ 156/253 |

*Primary Examiner*—William P. Watkins, III
*Attorney, Agent, or Firm*—McGlew and Tuttle, P.C.

[57] ABSTRACT

A house wrap film product includes a laminated poly film with a first poly film ply and a second poly film ply and micropuncture formed in the laminated poly film to allow vapor transmission from a first side of the laminated poly film to a second side of the laminated poly film. Each of the poly plies is formed of a spiral cut film having a first ply with a first orientation and a second ply having a second orientation, the first orientation being at an angle with respect to an edge of said film and said second orientation being at an angle with respect to an edge of said film, said first ply and said second ply being laminated together cross oriented such that said first orientation extends in a different direction from said second orientation. The micropuncture provides a deformed region of said film, surrounding said hole. A method is provided for forming the house wrap product.

20 Claims, 6 Drawing Sheets

MICROPERFORATED STRENGTH FILM FOR USE AS AN ANTI-INFILTRATION BARRIER

This is a continuation-in-part application of application Ser. No. 08/470,071 filed Jun. 6, 1995, abandoned.

FIELD OF THE INVENTION

The invention relates to housing insulation and sealing from drafts in general and more particularly to a film used providing a barrier for constructions including homes wherein vapor can pass from one side of the house wrap film to another but the film provides a barrier to water and prevents air infiltration.

BACKGROUND OF THE INVENTION

Films of various sorts have been used as protective coverings for buildings. Films are often used to bar water while allowing sunlight in such as greenhouse films. The various films known, are directed to various different applications depending on the properties of the film. The composition of the film is provided to meet a specific requirement of the end use.

U.S. Pat. No. 4,961,297 discloses a greenhouse exterior film. The film is provided in the form of transparent building panels which transmit solar light and heat into the building enclosure. Each panel is supported by a rigid framework and is connected to a support system of the building. This patent is not concerned with providing additional insulation or breathability to an already existing structure or providing additional insulation to a building under construction. This prior art disclosure does not consider providing vapor permeability while preventing air infiltration and water infiltration.

U.S. Pat. No. 4,397,122 proposes a method of protecting a construction to protect the interior against the action of wind and rain. This patent proposes the use of a knitted fabric of glass fiber threads. The proposed fabric is intended as a temporary measure only and this patent fails to propose a barrier film which allows vapor transmission but provides protection to a structure by preventing air infiltration and water infiltration.

U.S. Pat. No. 4,206,575 proposes a covering for mobile homes. The covering includes an outer layer of waterproofed material and an inner layer of film-type insulating material bonded to the outer layer. This covering has the possibility of trapping water vapor between the mobile home and the outer waterproof layer. This covering would not be useful as an protective layer for a house or the like in that moisture would build up between the covering and the vapor barrier of the structure.

The product sold under the trade name TYVEK by the company DuPont has been proposed for use as a house wrap, to provide protection and insulation. TYVEK is a nonwoven fabric of polyethylene fibers. The fabric allows vapor to pass through the porous fabric however the fabric generally provides a barrier to air and water. These desirable attributes are offset by the expense involved in manufacture, making it higher in cost than extruded films. Also the fabric itself, although effective when installed, is somewhat more difficult to cut, fit and connect adjacent strips than typical extruded films.

Similar film type products are also offered by other companies for house wrap barrier and insulation purposes. These additional products include TYPAR offered by the Reemay Company and BARRICADE, offered by the Simplex Company among others. All of the products have some drawbacks including cost of manufacture and ease of insulation as well as an effective balance of properties between resistance to water penetration and high vapor transmission without allowing direct admission of air. These often involve intricate woven configurations, coatings on either or both sides and other manufacturing processes.

Problems with the use of products as noted above have been noted in the literature (See for example Energy Design Update—August 1996 pages 5–6). Indeed, the mechanism for allowing vapor to pass through and otherwise to provide a barrier, is still not understood. It is known that perforating films from spun bonded films like Typar and woven films like Amowrap and smooth films like R-wrap have been demonstrated. However, it is also known that these perforated films have not worked satisfactorily in actual practice.

SUMMARY AND OBJECTS OF THE INVENTION

It is an object of the invention to provide a protective barrier and insulative house wrap which allows vapor transmission between sides of the house wrap and through the house wrap film in both directions but is air impermeable and water impermeable and which otherwise provides insulating properties and is preferably formed of film such as a polyolefin film which is easily manufactured and manipulatable during use. The barrier must also have inherent properties to resist changing conditions while in place and to avoid losing its properties of vapor transmission without liquid water penetration.

According to the invention, a house wrap film is formed of laminated poly films providing a house wrap film product comprising a first poly film ply and a second poly film ply and then micropunctures are formed in the laminated first and second poly film plies to allow vapor transmission from a first side of the laminated plies to a second side of the laminated plies without water penetration. Each of the poly plies is formed of a spiral cut film having a first ply with a first orientation and a second ply having a second orientation, the first orientation being at an angle with respect to an edge of the film and the second orientation being at an angle with respect to an edge of the film, the first ply and the second ply being laminated together in a cross oriented fashion such that the first orientation extends in a different direction from the second orientation. The lamination can be accomplished with heat bonding or with adhesives passing through smooth or corrugated nip rolls to seal the films together but ultimately resulting in a corrugated laminated film structure. The micropunctures are formed preferably spaced apart a distance of between ⅛" to ¾" in horizontal or diagonal patterns (equivalent to 64 holes/sq. in. to 4 holes/sq.in.) and formed providing a hole having a diameter of approximately 0.010" to 0.040" preferably less than 0.035. The formation of the micropuncture provides a deformation in said house wrap film product, surrounding each micropuncture hole. The punctures can be made with a rotating drum containing the sharp-pointed needles or with a fixed bed which fuses up and down, both against a soft under roller platform made from such material as rubber or the like, or a foam or fibrous material like a rug or brush.

The invention further provides a method comprising the steps of providing a laminated poly product formed of a first ply and a second ply; and micropuncturing the product to form the house wrap product.

The lamination of the poly films is preferably accomplished during feeding of the poly films between nip rollers wherein the nip rollers impart a texture or relief to the composite poly film product. The poly film product is subsequently subjected to micropuncturing.

Micropuncturing is significantly different from microperforating and provides actual micropuncture in the poly film product. This results in a convex structure surrounding the micropuncture hole on one side and a concave structure surrounding the puncture hole on the reverse side. The convex raised or volcano-like side of the poly film product and a corresponding reverse structure on the opposite side of the poly film product contribute to the barrier effect, as to water and air and nevertheless allows for more than adequate vapor transmission, allowing for humidity and pressure balancing between sides of the product. The micropuncturing can be performed in one direction or the other and can also be provided with mixed puncture directions. The volcano shaped structure and opposite structure also combine with the textured surface to improve the barrier effect. Examples of perforation dies, including information as to the arrangement of holes is available from catalogs of Perforating Industries, Inc. of Linden, N.J. (Perforating catalog 93 of Perforating Industries, Inc., is hereby incorporated by reference).

The micropuncturing of the poly film allows vapor transmission from one side of the film to the other. However, the openings provided by the micropuncture processing are of a size, and cooperate with the imparted structures, to not allow for air permeation or water permeation. This structure provides an effective barrier to air and water and provides a significant protective barrier effect for a structure. The effect is especially advantageous when the micropuncture is performed on a poly product with the relief formed therein. Other techniques result in donut type holes that do not have the properties of the open conical shape obtained according to the invention.

In most film products presently used for this application, the holes are comparatively large and the openings are symmetrical in shape allowing water to pass through if the surface tension of the liquid is reduced. This is possible in applications whereby a smooth film makes contact with a solid surface (exterior siding or the concealed sheathing). The natural or synthetic surface can contain materials that act as surfactants, lowering the surface tension of the liquid water that may form at the surface, through condensation when the vapor is not removed quickly enough, at the interface of the film and the solid surface or surfaces. Since the holes are large or have no conical configuration and are therefore smooth sided or are inverted due to the fibrous condition in the case of the non-woven film, a small amount of decrease in the surface tension results in water passage.

Due to the corrugations in the film according to the invention, no side of this film will come in such intimate contact with the solid surfaces such as the siding or sheathing. Additionally, because the film has a conical and restricted hole shape as well as reduced size of the hole, a small change in surface tension is not sufficient to cause water penetration. The amounts of surfactant derived from the solid surface is not enough to allow passage through the film, especially in the case of the inverted conical apex, and the lack of intimate contact with the solid surfaces and the natural drainage channels caused by the corrugations do not permit liquid water to be retained at the apertures long enough for water penetration even if condensation could occur. Even in water penetration tests whereby small amounts of surfactant are added to the liquid, the film described herein resists water penetration to a far greater degree than any present product, or theoretical products made from combinations or extensions of the prior art.

The process described herein for the micropuncturing of the film details the need for the needle or pin configuration. It also points out the need for a soft under roller or backing. It is important to point out that without the unique use of a soft under roller that does not become permanently deformed after repeated use, one cannot achieve the conical shape and the small diameter of the hole despite the previous art use of perforating. Present techniques such as those described in the previous art utilize hard bakers which develops open spaces with continued use. As a result the holes become flat and expanded with the excess material from puncturing essentially rolled up on the reverse side. This causes the hole to remain expanded and reinforced in that shape and to offer a sloped side on both sides of the film which tends to invite liquid into the gap rather than bridge it due to the inherent surface tension of the liquid water.

Non-uniform hole sizes are also provided according to the invention. Since the film is corrugated, some holes are smaller than others due to the fixed length of extension of the pins (even when the pins are spring loaded to slow down or resist deep penetration). With such a pin situation, the valleys in the film are penetrated to a lesser extent than the peaks making the holes made by the tapered pin significantly smaller. Those on the peaks, while larger, are also now producing a volcano shape in the reverse valley. This means one side (the under side while processing) is extremely resistant to water penetration. The upper side, which becomes the underside upon application, is less resistant initially but upon its contact with the sheathing is compressed somewhat and the hole is further restricted making both sides very resistant to liquid water penetration without losing the ability to transmit vapor freely. This is a truly different, key and unique feature that only is accomplished according to the invention.

Test data supports the observed fact that existing products made with typical perforations such as those described in the prior art do not function adequately under field conditions. The configuration and corrugation of the invention have been shown to be important to avoid intimate contact between the smooth house wrap and the adjacent solid surfaces (exterior siding and interior sheathing). Taken individually, the corrugation or the hole configuration will not solve a commercially perplexing problem. It is the intricate and unique combination of several factors and the process of arriving at these properties that result in a house wrap that does function in the field as well as passing laboratory or standards tests.

It is a further object of the invention to provide a house wrap product, preferably formed of poly film which is efficiently manufactured and which is easily manipulated and bonded during application.

It is still a further object of the invention to provide such a film product which can be heat bonded to connect portions for wrapping a house.

It is a further object of the invention to provide a house wrap with corrugations and conical openings which avoid intimate surface contact with adjacent solid surfaces such as exterior siding or interior sheathing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1A:
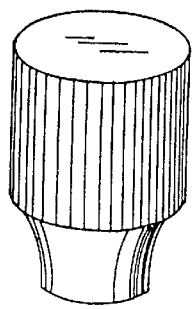
FIGS. 1A–1B and 1C are perspective views showing the formation of a composite film product from two sheets of cross oriented poly film with the cross-orientation of each film in opposite directions or at angles or various degrees that oppose one another the composite film product being used to form the house wrap product according to the invention.

Referring to the drawings in particular, the invention comprises a house wrap product, generally designated 100. The house wrap 100 is formed to provide an air and water barrier, for structure insulation. The house wrap 100 also allows vapor transmission between two different sides of the house wrap product.

Figure 1B:
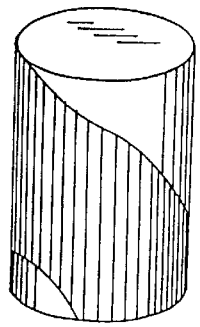
Figure 1C:
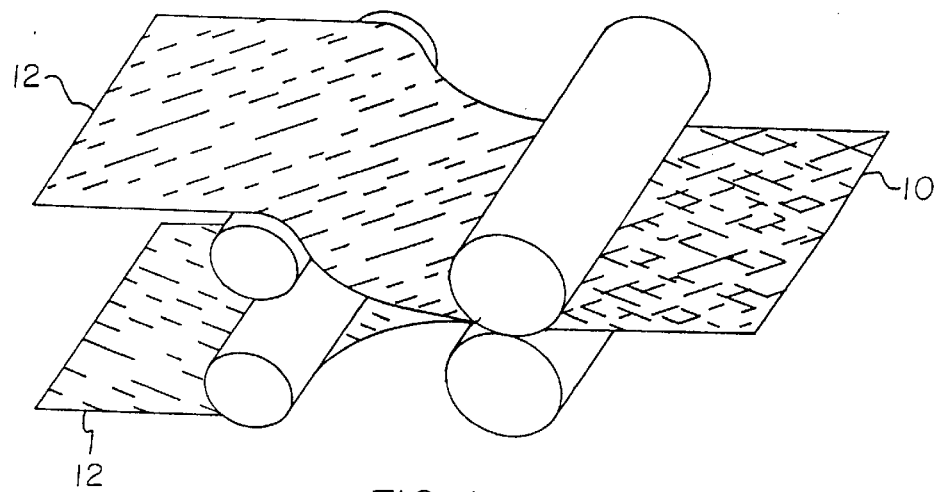
Figure 2:
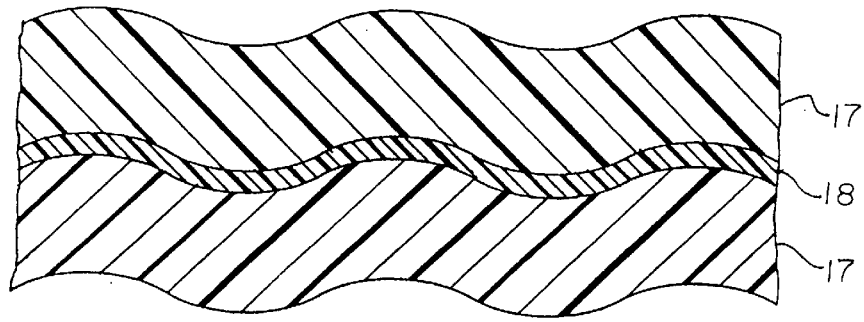
FIG. 2 is a sectional view through the composite film product, with a textured surface, used to form the product according to the invention.

As shown in FIGS. 1 and 2, a poly film is employed which is a composite structure 10, formed of two main plies 12. Each of the plies 12 is preferably a two- or three-layered cool extruded poly film which is blown in a first step shown in FIG. 1A. The film is in spiral cut as shown in FIG. 1B to provide an angled orientation of the film, thereby providing tear strength. In a third step shown in FIG. 1C, the two plies are stretched and cross oriented (the lines on the film in FIG. 1C represent the orientation of the film plies 12) and laminated together, using lamination nip rollers. This provides a basic poly film product as shown in FIG. 2. The poly film structure may comprise a seal layer as an outer layer, and requires a strength layer 17. A lamination or adhesive layer 18 may be used to bond the film plies.

According to another feature of the invention, the composite structure is preferably provided with a textured surface, corrugations (provided with a relief) formed on the surface. This is accomplished according to the invention by providing lamination nip rollers 200 with a pre-defined pattern, wherein the nip rollers 200 engage as the poly film is fed, thereby providing a relief on one side of the film and a corresponding contour on the other side of the film. This provides a poly film 20 with a relief structure 22. According to a preferred embodiment, the basic film is provided with the corrugations during combination of the two film layers of different orientation (by passage through the nip roller 200). The nip roller 200 is shown as a corrugation roller 200 in FIG. 5a. The corrugated basic film is then subjected to perforation as shown at 202.

Figure 3A:
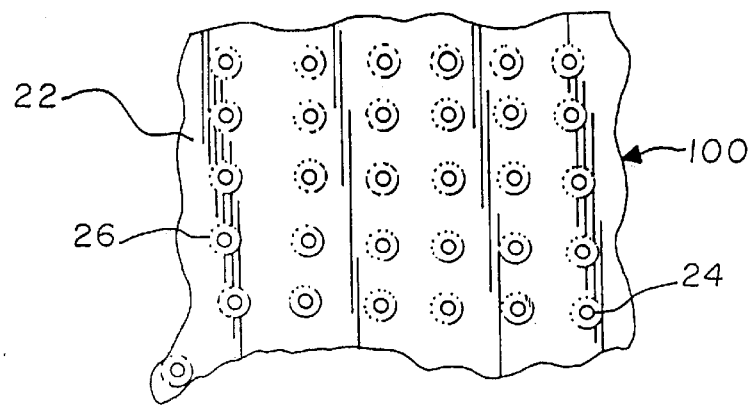
FIG. 3a is a top view of a portion of house wrap product, after micropuncturing on an enlarged scale.
Figure 4:
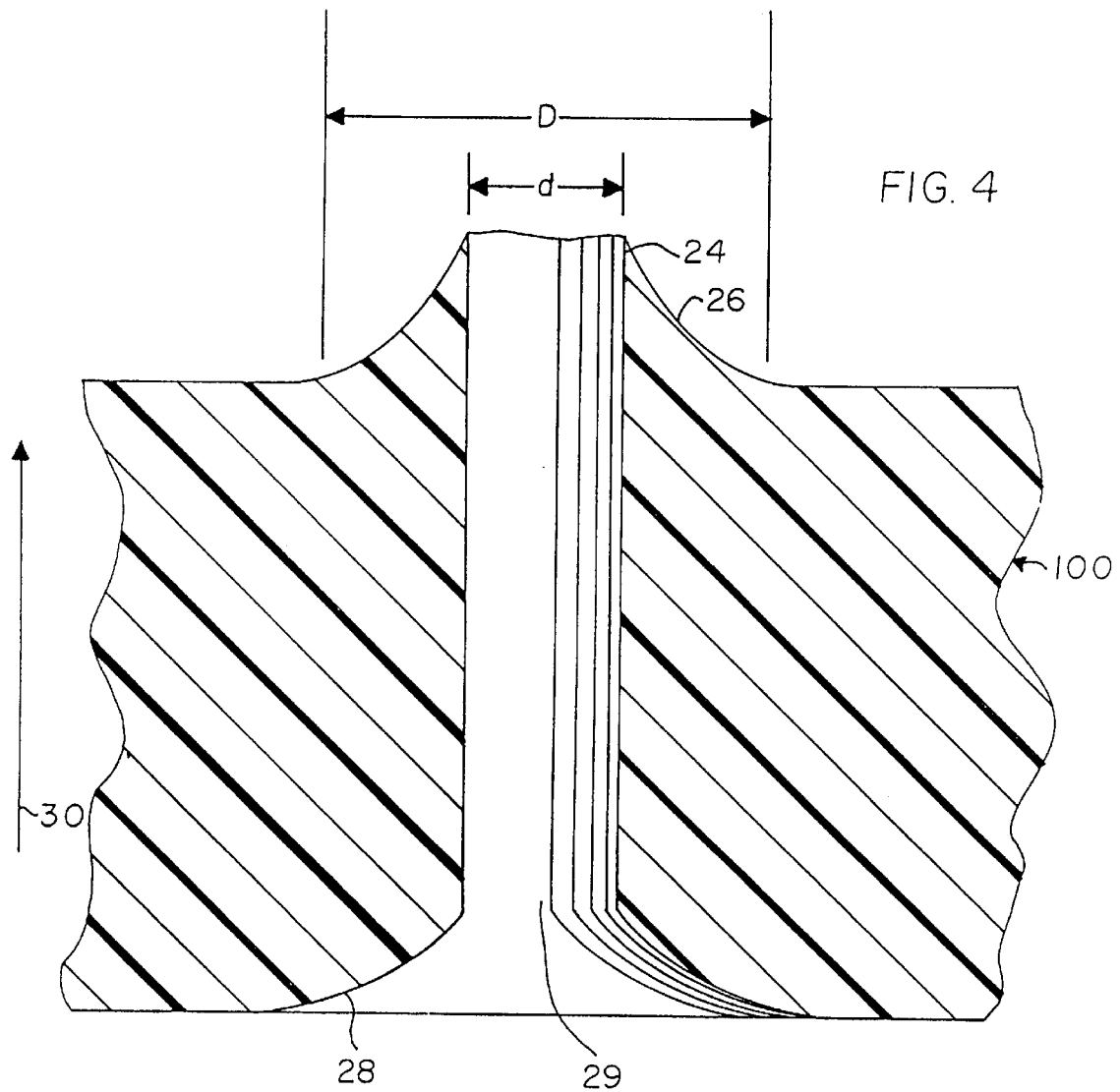
FIG. 4 is a cross sectional view of the house wrap product, after micropuncturing, on a greatly enlarged scale.
Figure 3B:
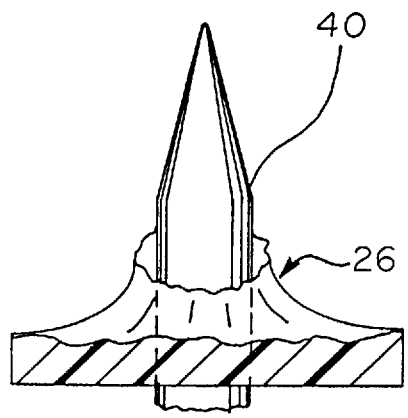
FIG. 3b is a perspective sectional view showing the puncturing of the film product show in FIG. 2.

As shown in FIGS. 3a and 3b, the invention provides micropuncturing of the poly film 20 to provide the house wrap product 100. The house wrap product 100 has micropuncture holes 24 formed therein. As the micropuncture is based on a puncture as opposed to for example a perforation, a portion of the film product is pressed by a pin 40 in the direction of the puncture as shown in FIG. 3b. This creates a volcano type structure 26, surrounding each puncture hole 24 as shown in FIG. 4. The surrounding, deformed structure has a diameter D, approximately in the range of from 0.0125" to 0.05" (0.0125 inch to 0.05 inch) and preferably less than 0.044 inch. The puncture hole preferably has a diameter between approximately 0.010" and 0.040" and preferably less than 0.035 inch. The taper of the pin 40 makes the opening at the top of hole 24 smaller than at the bottom. The material 100 is somewhat elastic and rebounds when the pin 40 is withdrawn. In FIG. 4, the volcano type puncture structure can best be seen wherein the puncture is in the direction of arrow 30. The structure 26 is convex and a similar opposite structure 28 is concave initially but becomes level when the puncture probe (pin 40) is withdrawn. The surrounding portion 26, affected by the puncture, extends in the direction of arrow 30. The region surrounding the opening 29 helps create an air and water barrier while allowing vapor transmission between two sides of the house wrap product 100. Further, when the puncturing is provided on poly film 20, including relief structure 22, the micropuncturing has the effect of providing vapor transmission while providing a very good barrier to water and air.

Figure 5C:
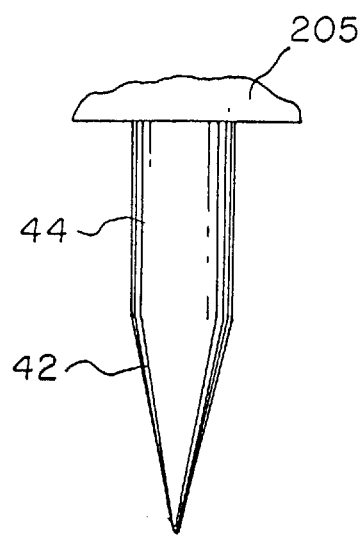
FIG. 5c is an enlarged view of a pin on the perforating cylinder according to the invention.
Figure 5D:
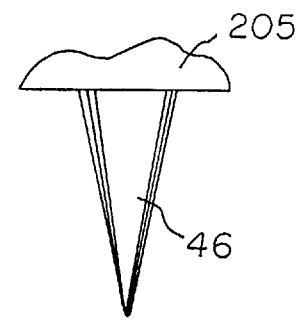
FIG. 5d is an enlarged view, similar to FIG. 5c, of another pin on the perforating cylinder according to the invention.
Figure 5A:
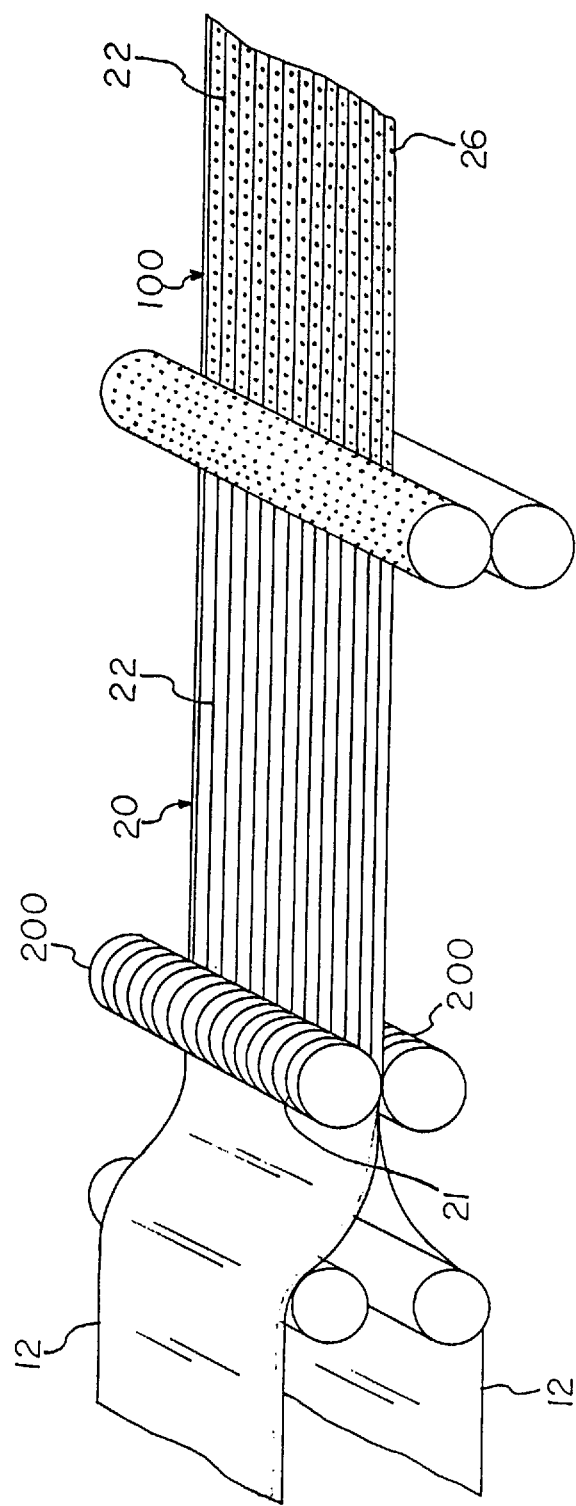
FIG. 5a is a schematic perspective view showing the processing of the film, to form the house wrap product according to the invention.

As shown in FIG. 5a, the micropunctured house wrap product 100 is prepared by first extruding and blow molding a base poly film which is basically a homogeneous film or even a two layer co-extruded product which is formed of some type of poly material and is blown to form the basic film element. In a step (a step which is known per se), the film is spiral cut which provides film strips having great tear strength in view of the orientation of the film being at an angle to the film edge. Two plies of the basic film structure 10 are stretched and laminated together wherein the orientation of one film is opposite to the orientation of another film (cross-orienting). Preferably, according to the invention, the nip rollers 200, which act during the lamination process, have engaging grooves 21 forming ridges or other type of relief patterns 22, in the poly film product 20. As noted above, according to the preferred embodiment, two plies of the basic film structure 10 are fed to nip rollers 200 where the surface of the nip rollers are corrugated to impart an irregular pattern. Subsequently, the poly film product 20 is subjected to micropuncturing at 204, resulting in the house wrap product 100.

Figure 5B:
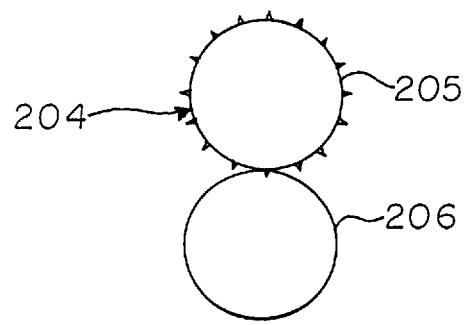
FIG. 5b is an end view of the micropuncturing station according to the invention.

As shown in FIG. 5b, the micropuncturing station generally designated 204 preferably includes a roller 205 with a plurality of needles or pins 40. Such a roller may be, for example a cylinder with pins supported by shafts whereby the cylinder is rotated for forming the micropuncture. Such rollers with pins are available from the company Robert A. Main and Sons Inc., 555 Gothel Road, Wyckoff N.J., 07481, USA. However, a more advantageous arrangement employees a flexible needle holder. The needles are attached to the perforating roller 205 in such a manner that they are able to be depressed (move radially inwardly) when excess pressure is applied to them. Each needle is essentially on a spring (an individual spring or the flexible support provides a common spring). This allows the springs to retract when the force exerted against them is higher than is desirable to get the proper shape and depth of the hole. The roller 105 is preferably provided wherein each of the pins as shown in FIGS. 5c and 5d are spring loaded, to slow down or resist a deep penetration. For example a spring loading of the pins of FIGS. 5c and 5d can result in pin movement during this process wherein the maximum hole is varied, based on a puncturing of the uneven corrugated film. Some holes are smaller than others due to the fixed length of extension of the pins (even when the pins are spring loaded to slow down or resist deep penetration). With such a pin situation, the valleys in the film are penetrated to a lesser extent than the peaks making the holes made by the tapered pin significantly smaller. Those on the peaks, while larger, are also now producing a volcano shape in the reverse valley. This means one side (the under side while processing) is extremely resistant to water penetration. The upper side, which becomes the underside upon application, is less resistant initially but upon its contact with the sheathing is compressed somewhat and the hole is further restricted making both sides very resistant to liquid water penetration without losing the ability to transmit vapor freely.

The micropuncturing station 204 further includes a soft roller 206 which engages the roller 205. The soft roller 206 may be formed of a soft material, allowing engagement with the pins of the roller 205. The soft roller 206 is formed with a soft foam backer. This foam is resilient such that it regains its position after force is applied. The foam supports the film. As an alternative, a stiff bristle brush with a myriad of fine fibers, similar a piece of fiber on end carpet is provided on the roller 206. The bristles extend radially outwardly from the roller 206. The needles therefore do not contact any solid backing and yet the film is totally supported by the bristles. The bristles provide full support and there is no suspension or stretching as occurs over a hard roller. Roller 204 may also be in the form of brushes, which form a surface which supports the poly film product 20, but allows the pins 40 to penetrate. Similarly, the soft roller 206 is formed of a material which can support the poly film product 20 but which allows the pins 40 to penetrate.

FIG. 5c shows one example of a pin configuration according to the invention. Pin 40 includes a tapered portion 42 which preferably has a length from ¼ inch to ½ inch. The tapered portion is connected to a stem of a diameter of 0.020 to 0.040 inch. The length of the stem 44 is between 0 and ⅜ inch in length. An alternative example is shown in FIG. 5d, wherein the cylinder 205 has a plurality of pins 45. The pin is a conical structure with a tapered shape, with a base diameter (at the location wherein the cone attaches to the cylinder) of 0.040 inch. The length of the pin is from ⅛ inch to ¾ inch. These pins provide advantageous micropuncture in a poly film product 20.

Figure 7:
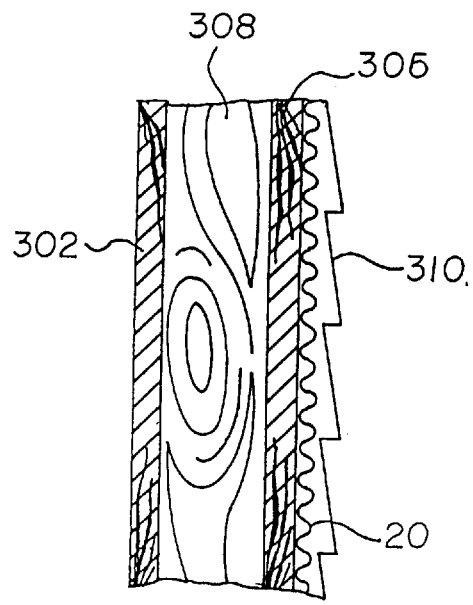
FIG. 7 is a cross sectional view of a house wall with the applied air infiltration barrier of the invention.
Figure 6A:
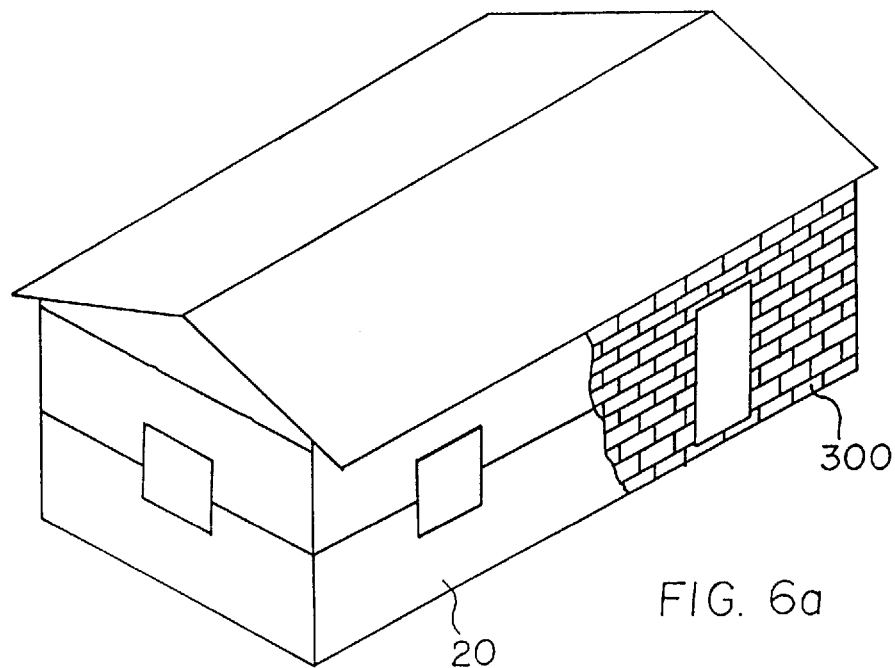
FIG. 6a is a perspective view showing the application of the film wrap air infiltration barrier with micropunctures according to the invention as it is applied to the exterior of a house under the external siding material.
Figure 6B:
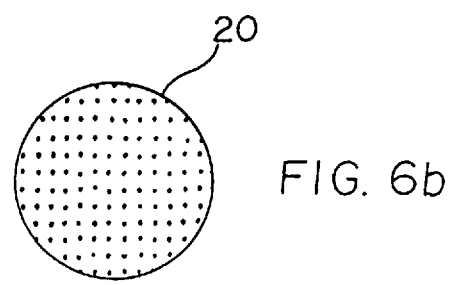
FIG. 6b is a front view of the air infiltration barrier of FIG. 6a, on a greatly enlarged scale.

As shown in FIG. 6a the air infiltration barrier with micropunctures, referred to above as poly film product 20 is applied to a finished exterior wall 300. As shown in FIG. 6b, the poly film product 20 or air infiltration barrier with micropunctures includes the micropuncture, which can best be seen on a greatly enlarged scale (as per FIG. 6b). As shown in FIG. 7 the finished wall is based on an interior wall 302 with a vapor barrier 304 and an exterior wall 306, connected to the interior wall by stud 308. The breathable house wrap (namely the poly film product 20 according to the invention) is applied to the exterior wall or exterior sheathing 306, under the exterior siding 310. Subsequently, a siding or the like can be applied in addition, lap, brick, etc. can also be applied.

While a specific embodiment of the invention has been shown and described in detail to illustrate the application of the principles of the invention, it will be understood that the invention may be embodied otherwise without departing from such principles.

What is claimed is:

1. A house wrap film product, comprising: a laminated polyolefin film including a first polyolefin film ply and a second polyolefin film ply, said first ply having a first orientation and said second ply having a second orientation, said first orientation being at an angle with respect to an edge of said film and said second orientation being at an angle with respect to an edge of said film, said first ply and said second ply being laminated together cross oriented such that said first orientation extends in a different direction from said second orientation, said laminated polyolefin film being corrugated; and micropuncture formed in said laminated polyolefin film to allow vapor transmission from a first side of said laminated polyolefin film to a second side of said laminated polyolefin film, each of said micropuncture including a hole with a surrounding conical shape extending outwardly of a surface of said laminated film at one side and having a concavity at an opposite side.

2. The house wrap film product according to claim 1, wherein each of said polyolefin plies is formed of a spiral cut polyethylene film.

3. The house wrap film product according to claim 1, wherein said micropunctures are formed providing a hole having a diameter of 0.010 inch–0.040 inch.

4. The house wrap film product according to claim 3, wherein said micropunctures surrounding region is a deformed region surrounding said hole of said micropuncture, said deformed region having a diameter of 0.02 inch nominal and a height of as much as 0.01 inch.

5. The house wrap film product according to claim 1, wherein said micropuncture provides a deformed region of said film, surrounding said hole.

6. A process for forming a film house wrap, comprising the steps of:
    forming a laminated polyolefin film product of a first ply and a second ply;
    forming corrugations in the film including a relief structure on outer surfaces of said poly film product, during formation of said poly film product;
    micropuncturing said product without removing polyolefin film product to provide a hole with a surrounding conical shape extending outwardly of a surface of said laminated film at one side and having a concavity at an opposite side; and
    applying the micropunctured film wrap to a structure to provide a moisture barrier which is vapor transmittable with essentially no air infiltration.

7. A process according to claim 6, wherein said micropunctures are provided spaced from ⅛ inch to ¾ inch apart in one of a lateral and diagonal direction.

8. A process according to claim 6, wherein said laminated polyolefin film has an irregular surface defining said relief structure.

9. A process according to claim 6, further comprising forming said polyolefin film product with polyethylene film plies formed of a spiral cut polyethylene film with a first ply with a first orientation and a second ply having a second orientation, said first orientation being at an angle with respect to an edge of said film and said second orientation being at an angle with respect to an edge of said film, said first ply and said second ply being laminated together cross oriented such that said first orientation extends in a different direction from said second orientation.

10. A process according to claim 8, wherein said surface irregularities are formed in said film product prior to said step of micropuncturing.

11. A house wrap film product, comprising: a laminated polyolefin film including a first polyolefin film ply and a second polyolefin film ply, said first ply having a first orientation and a said ply having a second orientation, said first orientation being at an angle with respect to an edge of said film and said second orientation being at an angle with respect to an edge of said film, said first ply and said second ply being laminated together cross oriented such that said first orientation extends in a different direction from said second orientation; and micropuncture formed in said laminated polyolefin film to allow vapor transmission from a first side of said laminated polyolefin film to a second side of said laminated polyolefin film, wherein each of said polyolefin plies is formed of a spiral cut polyethylene film, said laminated first ply and said second ply being provided with surface irregularities to define a surface relief, each of said micropuncture including a hole with a surrounding conical shape extending outwardly of a surface of said laminated film at one side and having a concavity at an opposite side.

12. A house wrap film product according to claim 11, wherein said micropunctures are formed providing a hole having a diameter of 0.010 inch–0.040 inch.

13. A house wrap film product according to claim 12, wherein said micropunctures surrounding region is a deformed region surrounding said hole of said micropunctures, said deformed region having a diameter of 0.02 inch nominal and a height of as much as 0.01 inch.

14. A house wrap film product according to claim 12, wherein said micropuncture provides a deformed region of said film, surrounding said hole.

15. A process for forming a film house wrap according to claim 6, wherein:

said step of forming a laminated film includes providing a first polyolefin film ply and a second polyolefin film ply, said polyolefin plies being formed at a spiral cut film having a first ply with a first orientation and a second ply having a second orientation, said first orientation being at an angle with respect to an edge of said film and said second orientation being at an angle with respect to and edge of said film, said first ply and said second ply being laminated together cross oriented such that said first orientation extends in a different direction from said second orientation; and said step of forming corrugations includes engaging the laminated polyolefin film with nip rollers to provide a relief surface on one side of said film and corresponding contours on an opposite side of said film to provide a laminated polyolefin film product with irregular surfaces.

16. The process for forming a film house wrap according to claim 15, wherein said step of micropuncturing includes:

providing a needle roller with spring supported needles;

providing a backing roller with structure for supporting said film without resisting penetration of said needles;

engaging said needle roller with said backing roller and feeding the film between the engaged needle roller and backing roller while supporting and allowing penetration of said needles into said film and into said backing roller.

17. The process for forming a film house wrap according to claim 16, wherein said backing roller is includes radially outwardly extending bristles.

18. A process according to claim 6, wherein said laminated polyolefin film has an irregular surface defining said relief structure;

further comprising forming said polyolefin film product with polyethylene film plies formed of a spiral cut polyethylene film with a first ply with a first orientation and a second ply having a second orientation, said first orientation being at an angle with respect to an edge of said film and said second orientation being at an angle with respect to an edge of said film, said first ply and said second ply being laminated together cross oriented such that said first orientation extends in a different direction from said second orientation;

wherein said step of applying the micropunctured film wrap to a structure includes applying the filmwrap to an exterior wall under exterior siding.

19. The process according to claim 18, wherein said surface irregularities are formed in said film product prior to said step of micropuncturing.

20. The process according to claim 19, wherein said corrugations define spaces to exist between the housewrap and each of said exterior wall and exterior siding.

\* \* \* \* \*